J. P. TIERNEY.
MITER-MACHINE.
No. 187,431. Patented Feb. 13, 1877.
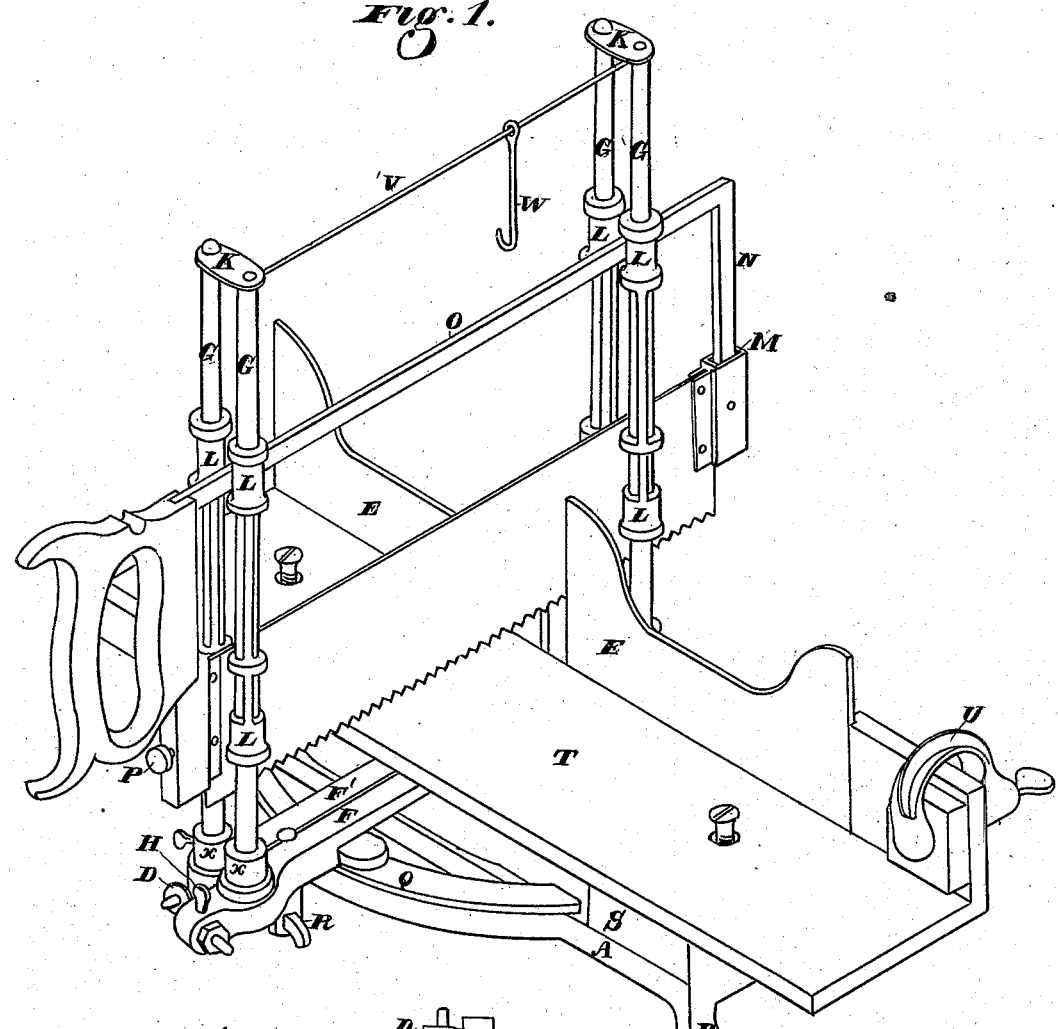
Fig. 1.
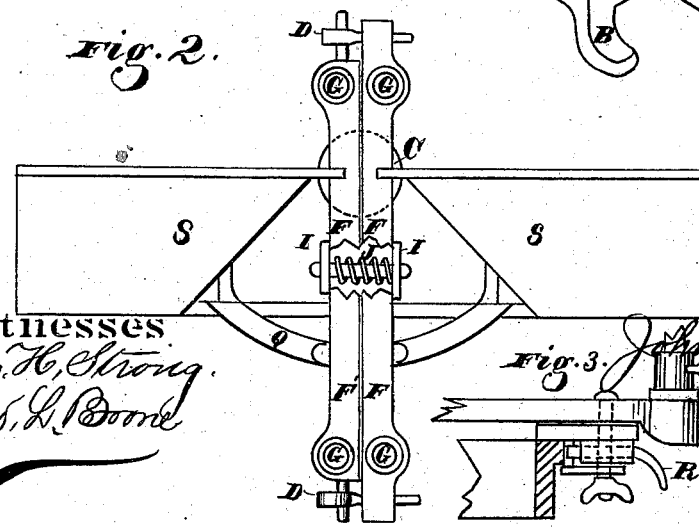
Fig. 2.
Fig. 3.
Witnesses
Geo. H. Strong.
Jno. L. Boone
Inventor
John P. Tierney
by Dewey & Co.
Attys

UNITED STATES PATENT OFFICE.

JOHN P. TIERNEY, OF SACRAMENTO, CALIFORNIA.

IMPROVEMENT IN MITER-MACHINES.

Specification forming part of Letters Patent No. 187,431, dated February 13, 1877; application filed September 4, 1876.

*To all whom it may concern:*

Be it known that I, JOHN P. TIERNEY, of the city and county of Sacramento and State of California, have invented an Improvement in Miter-Machine; and I hereby declare the following to be a clear, full, and exact description thereof, reference being had to the accompanying drawing.

My invention relates to certain improvements in mitering-machines, these improvements being more especially adapted to a machine for which Letters Patent were granted to me, and dated August 1, 1873.

Referring to the accompanying drawings for a more complete explanation of my invention, A is a frame, mounted upon legs B and supporting the miter-box E. The stationary and movable bars F F', which support the saw-guides L L, are supported upon a rotating support, C, which I have in the present case reduced in size and placed directly beneath the center of the miter-box, as shown.

In my present invention I have shown the bars F F' as connected together by means of eyebolts D at each end. The pivot or journal of the movable bar passes through the eye, and the stem of this eyebolt passes horizontally through the stationary bar F, and is held at any desired point by means of a set-screw, H. By this construction I am enabled to adjust the bars F F' to and from each other, so as to accommodate large and small saws.

I have simplified the means for closing and holding together the posts G, upon which the saw-guide rollers move; and it now consists of two short lever-arms, I I, projecting below the bars F F', and having a rod passing between them, which supports a spring, J. This spring serves to close the posts together, and they are locked by means of the latches K at the top, so that when the saw is in place the posts cannot be spread apart.

The guide-rollers L are constructed with a groove at the top, between which the back of the saw is held, while the two flanges near the bottom serve to hold the blade steady. Between these parts the slides of the rollers are cut away, as shown, so as to prevent the lodgment of saw-dust which might clog them, and prevent their rotation. The saw-blade has a socket, M, formed at each end, and vertical bars N, from the back or top bar O, enter these sockets. The bars N are perforated with holes, and a pin is put through the side of the socket into one of these holes, so as to hold the saw.

As the blade becomes worn the pins can be shifted, so as to retain the edge of the blade always at the same distance from the back, and its relative position to the rollers L will always retain the same. A set-screw, P, serves to draw the blade tight between the bars N.

A quadrant, Q, suitably graduated, is attached to the front of the frame A, and the bars F F' move over it, and are secured at any point by a clamping-screw, R. The bed-plates S, for the support of the working sole T, are secured to the frame A, having their inside ends beveled so as to allow the bars F F' to swing between them. The sole is made of any desired length, and the work to be cut lies upon it, resting against the back of the box E. A clamp, U, is secured to this sole, and when any number of pieces are to be cut to the same length they are simply gaged by setting this clamp to the desired position.

A rod or bar, V, extends across the top between two of the posts G, and a hook, W, depends from the bar so as to support the saw when not in use. The depth of the cut is regulated by means of adjustable collars X, which may be set to arrest the rollers L, when the saw has reached the bottom of its cut.

Having thus described my invention, what I claim as new, and desire to secure by Letters Patent, is—

1. The guiding-posts G G, mounted upon the movable and stationary bars F F', said posts being in combination with and closed and held together by means of the levers I and spring J, and the latches K, substantially as herein described.

2. The rollers L, constructed as shown and described, with their grooves and flanges for guiding and holding the back and blade of the saw, said rollers having their intermediate parts cut away or made open to prevent clogging.

3. In combination with the rigid and movable bars F F', with their guiding-posts and rollers mounted upon the rotating support C, the quadrant Q, and the clamping-screw B for holding the bars and guides in any position, substantially as herein described.

4. The saw consisting of the back or top bar O, with its depending arms N adjustably fitted into the sockets M of the saw-blade, in combination with the guide-rollers L of the standards G, so that the saw-blade may always be adjusted to the same position with relation to the rollers, substantially as herein described.

In witness whereof I hereunto set my hand and seal.

JOHN P. TIERNEY. [L. S.]

Witnesses:
GEO. H. STRONG,
OLWYN T. STACY.